United States Patent [19]
York et al.

[11] Patent Number: 5,967,611
[45] Date of Patent: Oct. 19, 1999

[54] RECLINING MECHANISM FOR A SEAT ASSEMBLY

[75] Inventors: Lyle E. York; Vijay Ramasamy, both of Peoria; Daniel E. Hayward, Chillicothe, all of Ill.

[73] Assignee: Caterpillar Inc., Peoria, Ill.

[21] Appl. No.: 08/974,969

[22] Filed: Nov. 20, 1997

[51] Int. Cl.$^6$ .................................................. B60N 2/02
[52] U.S. Cl. ......................................... 297/368; 297/367
[58] Field of Search ................................... 297/362, 369, 297/368, 367

[56] References Cited

U.S. PATENT DOCUMENTS

| | | | |
|---|---|---|---|
| 3,343,872 | 9/1967 | Werner et al. | 297/362 |
| 4,103,964 | 8/1978 | Klingelhofer et al. | 297/367 |
| 4,437,703 | 3/1984 | Nishikori et al. | 297/362 |
| 4,457,557 | 7/1984 | Une | 297/362 |
| 4,541,672 | 9/1985 | Fukuta et al. | 297/367 |
| 4,657,303 | 4/1987 | Croft | 297/362 |
| 4,660,886 | 4/1987 | Terada et al. | 297/367 |
| 4,889,386 | 12/1989 | Kochy et al. | 297/367 X |
| 4,940,284 | 7/1990 | Nagasaka | 297/312 X |
| 5,322,346 | 6/1994 | Notta et al. | 297/362 X |
| 5,590,932 | 1/1997 | Olivieri | 297/367 |
| 5,622,410 | 4/1997 | Robinson | 297/367 |
| 5,685,610 | 11/1997 | Minai | 297/369 X |
| 5,749,624 | 5/1998 | Yoshida | 297/367 |

*Primary Examiner*—Peter M. Cuomo
*Assistant Examiner*—Stephen Vu
*Attorney, Agent, or Firm*—Calvin E. Glastetter

[57] ABSTRACT

Current seat construction typically includes a mechanism by which the back portion of the seat may be adjustably reclined. These mechanisms have been known to have unacceptable relative movement between the seat components which has been the source of operator discomfort. The present invention comprehends a reclining mechanism that includes a gear connection between a pair of spaced extensions defined by a back portion of a seat assembly. The extensions engage a pair of stub shafts, each of which defines a gear assembly thereon. The stub shafts each define a hex-shaped socket and are interconnected by a shaft member. The shaft member defines a spherical hex head portion that engages the respective sockets and accommodates a preselected amount of lateral misalignment between the sides of the seat assembly and the respective stub shafts.

14 Claims, 4 Drawing Sheets

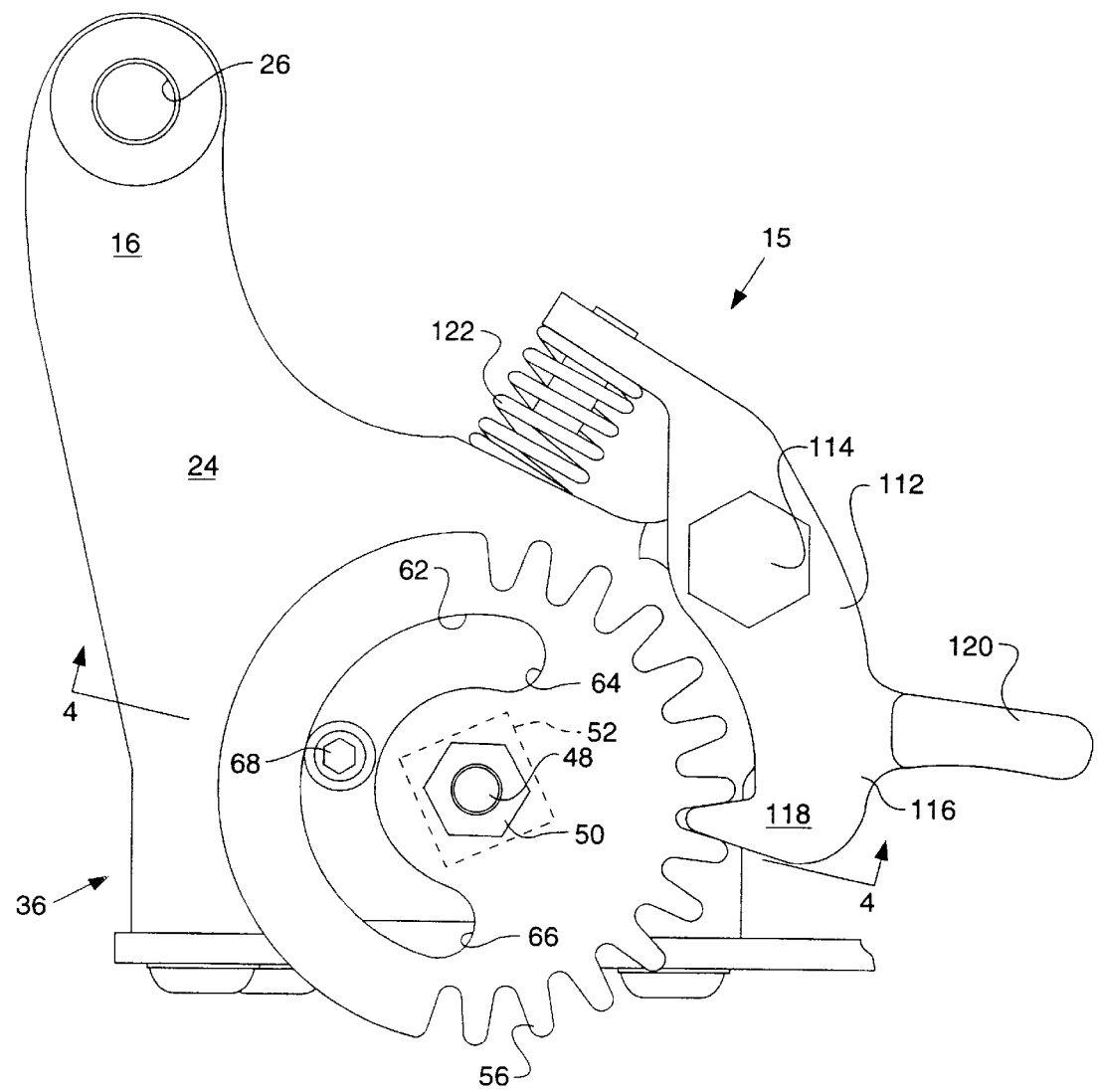

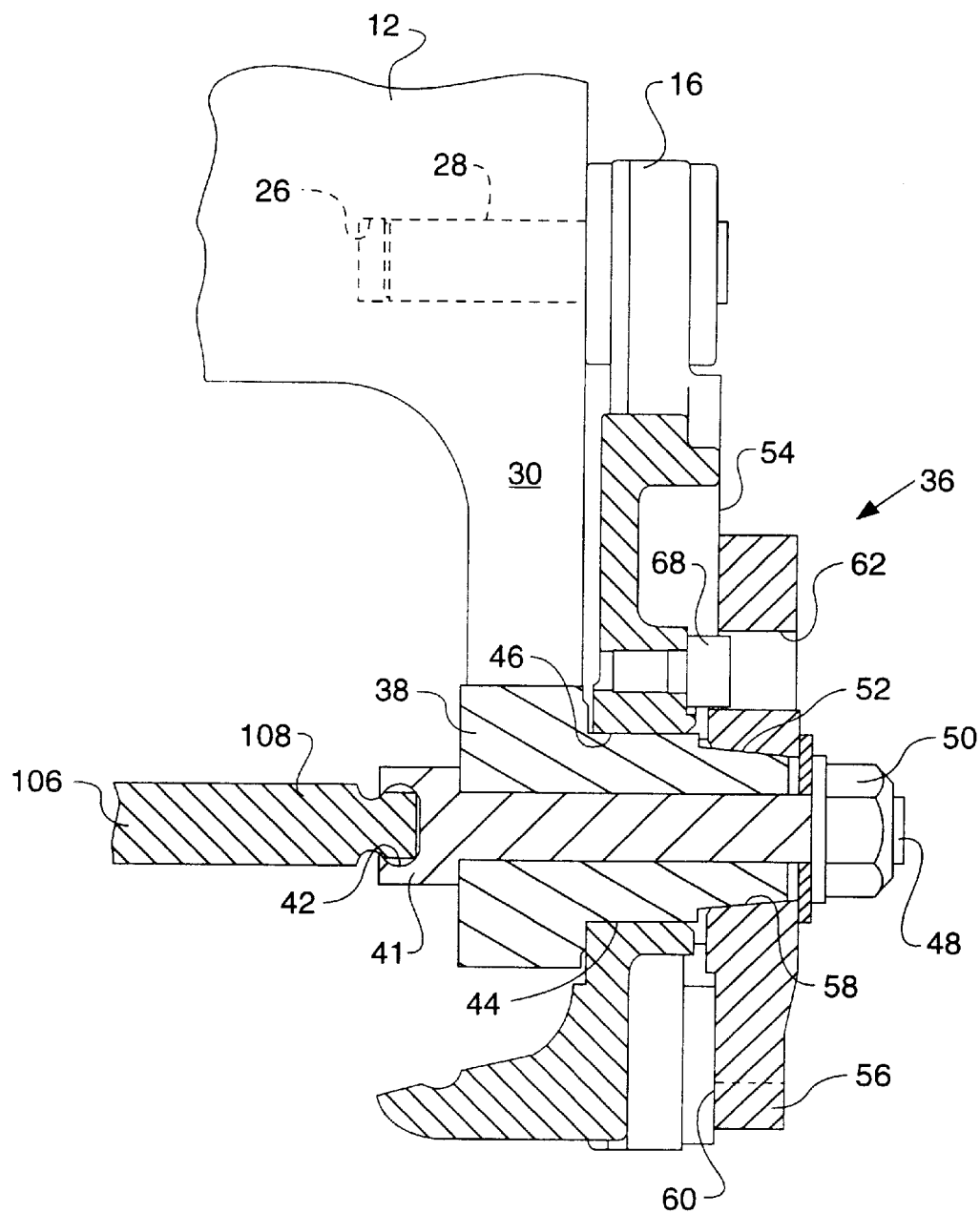

5,967,611

RECLINING MECHANISM FOR A SEAT ASSEMBLY

TECHNICAL FIELD

This invention relates to a reclining mechanism for a back portion of a seat assembly and more particularly to a reclining mechanism that will permit substantially no relative movement between the back portion of the seat and the base of the seat to which it is mounted.

BACKGROUND ART

It is well known in the operation of construction machines that the nature of the terrain in which they operate does not lend itself to providing a comfortable ride for the operator of the machine. This is especially true with the large machines that place the operator quite some distance off the ground wherein the rough conditions of the ground are amplified by the distance between the ground and the operator. This not only causes the operator some discomfort, it also is very fatiguing.

In order to counteract this situation, there have been many improvements made to the operator station or cabs of these machines. One area of improvement has been the seat assembly. Many seat assemblies have been provided with various adjustments to accommodate the varying sizes of operators. One of these adjustments resides in the tilting of the back portion of the seat with respect to the base to give the operator better support, and therefore greater comfort, in the area of his back. There have been several types of reclining mechanism that have been known to work quite well in providing an acceptable range of adjustment, however many of these mechanisms inherently have a significant amount of relative movement or "play" in the mounting structure. This relative movement is also amplified by the traverse of the machine over rough terrain and has been known to be a source of discomfort.

A typical reclining mechanism uses a plurality of gears that mesh with a portion of the seat back to permit relative rotation between the seat back and the seat base. A locking pawl engages one of the gears and prevents rotation of the gears thereby fixing the location of the back portion. While this works well to lock one side of the back portion it becomes a problem to lock both sides with a single locking mechanism and yet provide a mechanical stop for both sides of the seat back. In order to do this, extraordinary locating measures must be taken in the manufacturing and the assembly of the seat to insure that the meshing between the gears of the reclining mechanism and the seat back occur without binding. These manufacturing and assembly measures are not only costly and drive up the cost of the seat, but they also require an inordinate amount of time to properly locate and adjust the position of the various components during the assembly process to insure proper operation.

The present invention is directed to overcoming one or more of the problems set forth above.

DISCLOSURE OF THE INVENTION

In one aspect of the present invention, a reclining mechanism is provided for a seat that includes a base member and first and second mounting brackets that are mounted on opposite sides of the base member. A back portion of the seat is positioned between and pivotally mounted to each of the mounting brackets. The back portion defines a pair of extensions on a lower portion thereof, the extensions have a plurality of teeth formed on a distal end thereof and are spaced from one another so as to be positioned adjacent the respective mounting brackets. A first gear assembly is included that has a hexagonally shaped socket defined therein. The first gear assembly is rotatably mounted to the first mounting bracket for meshing engagement with the gears defined on one of said extensions defined by the back portion. A second gear assembly is included that has a hexagonally shaped socket defined therein and is rotatably mounted to the second mounting bracket for engagement with the gears defined by the other of the extensions defined by the back portion. A shaft member having first and second end portions, each defining a spherical hex head, is adapted for receipt within the respective sockets defined by the first and second gear assemblies. The shaft member selectively transmits rotation between or locks the position of the respective gear assemblies and thus the position of the back portion of the seat.

In another aspect of the present invention a reclining mechanism for a back portion of a seat is provided. The reclining mechanism includes a base portion and first and second mounting brackets that are mounted on opposing sides of the base portion. A pair of extensions are defined by the back portion and each has a plurality of gear teeth formed on a distal end portion thereof. The extensions are positioned in spaced relation to one another adjacent the respective mounting brackets. A first gear assembly is included that has a stub shaft that defines a hexagonally shaped socket on a first end portion thereof. A locking gear is mounted on the stub shaft and is positioned on a first side of the first mounting bracket. A positioning gear is mounted on the stub shaft and is positioned on a second side of the mounting bracket for meshing engagement with one of the extensions defined by the back portion. A second gear assembly is included that also has a stub shaft that defines a hexagonally shaped socket on a first end portion thereof. A positioning gear is mounted on a first side of the second mounting bracket in meshing engagement with the other of the extensions defined by the back portion. A shaft member is included that has first and second end portions, each of which define a spherical hex head that is adapted for engagement with one of the respective hexagonally shaped sockets defined by the first and second gear assemblies. The shaft member is adapted to accommodate a preselected amount of axial movement relative to the respective gear assemblies to accommodate a preselected amount of lateral misalignment between the respective mounting brackets.

With a reclining mechanism as set forth above, the back portion of the seat may be positioned and locked through a series of meshed gears on both sides of the seat back. This provides a very positive and secure structure and only requires a locking device that engages the gears on one side of the mechanism. The shaft member connects the first and second gear assemblies associated with the two sides of the back portion. This provides support for both sides of the back portion while permitting smooth relative rotation between the back portion and the respective gear assemblies. In addition, it positively locks the position of both sides of the back portion in response to the locking of one of the gear assemblies. Since the shaft has spherical heads on each end thereof that interact with the hexagonally shaped sockets formed on each gear assembly they permit a substantial degree of lateral misalignment between the two mounting brackets that may have occurred during the manufacture or assembly of the components.

BRIEF DESCRIPTION OF THE DRAWINGS

FIG. 3 is a diagrammatic section view taken along lines 3—3 of FIG. 1; and

FIG. 4 is a diagrammatic section view taken along lines 4—4 of FIG. 3.

BEST MODE FOR CARRYING OUT THE INVENTION

Figure 1:
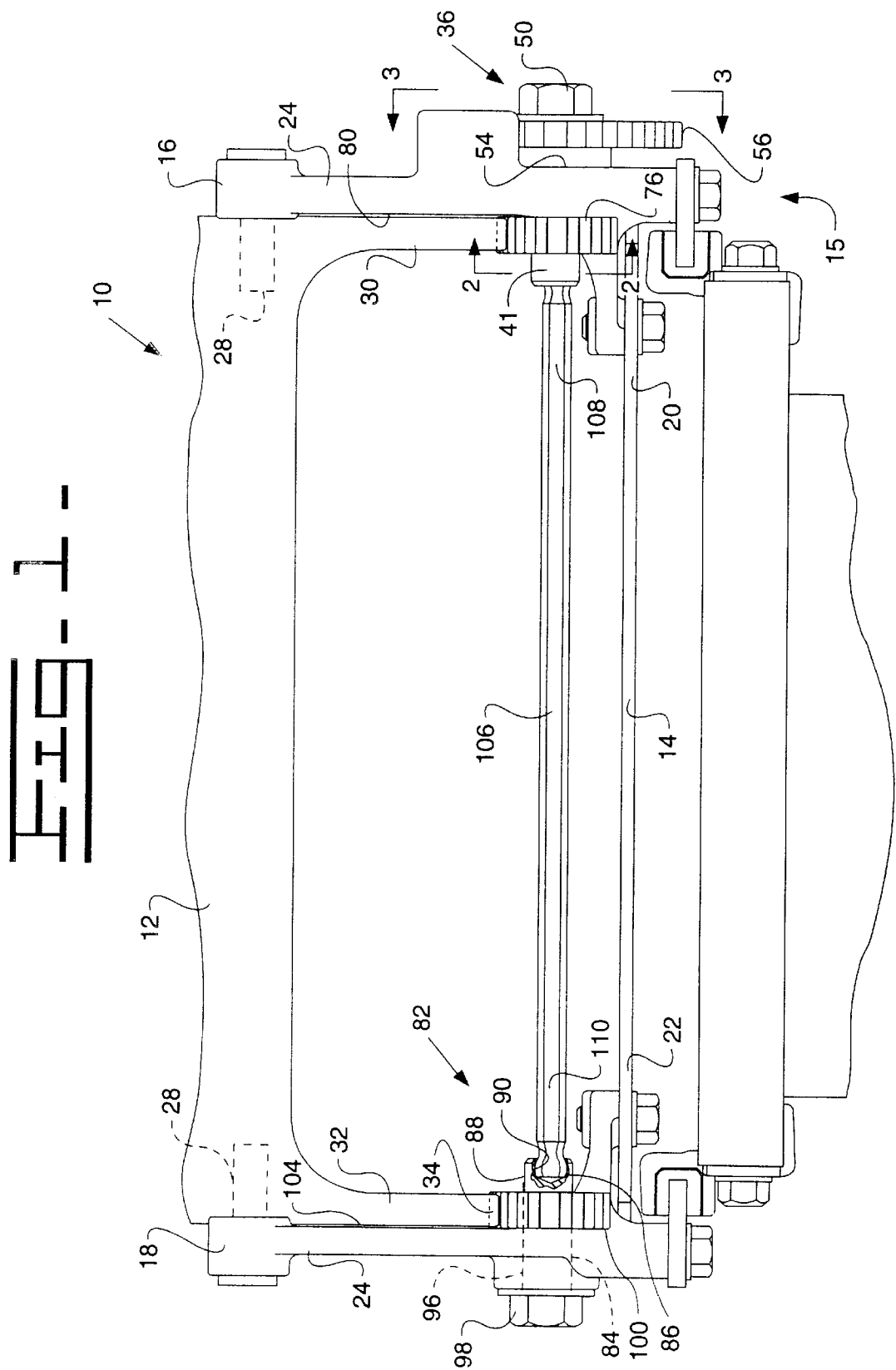
FIG. 1 is a diagrammatic rear view of a portion of a seat assembly that embodies the principles of the present invention.
Figure 2:
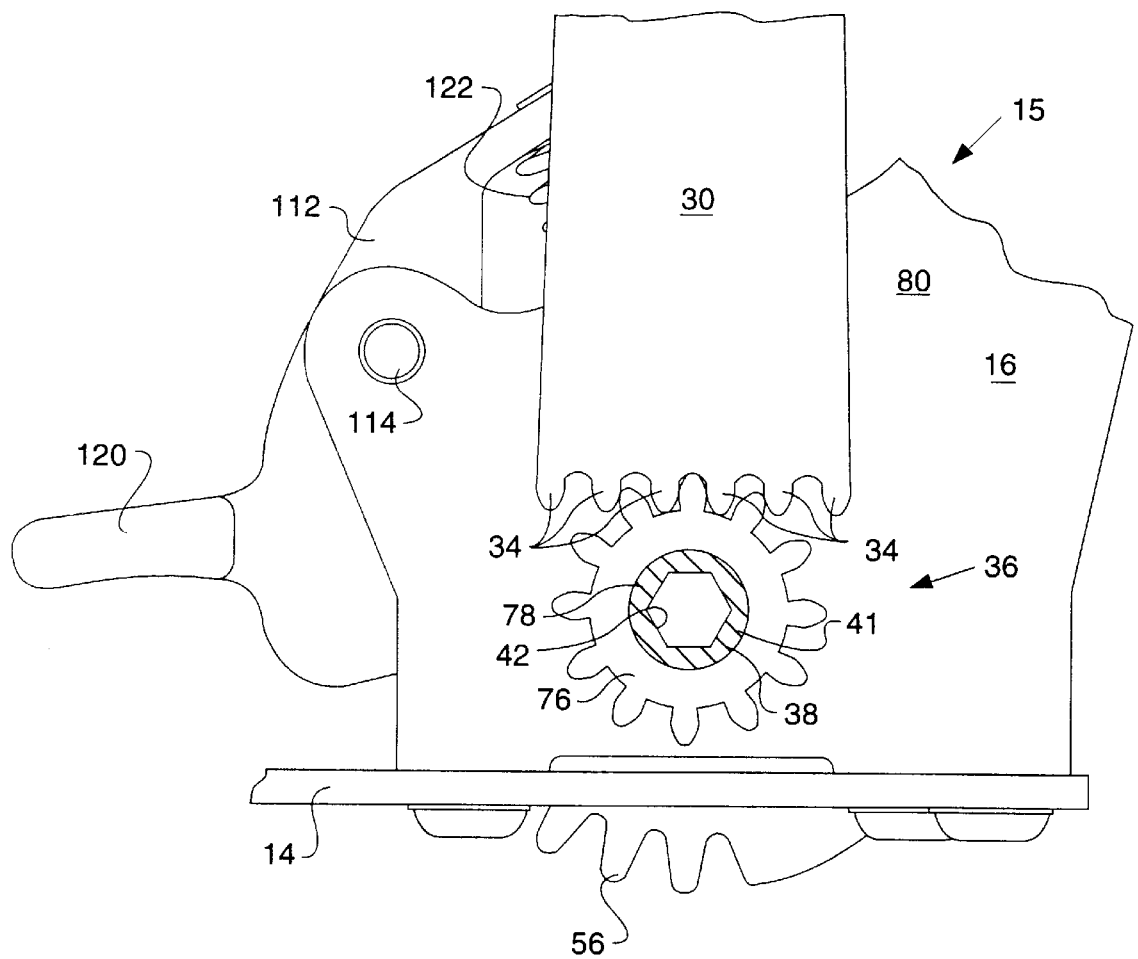
FIG. 2 is a diagrammatic section view taken along lines 2—2 of FIG. 1.

Referring to the drawings, it can be seen that a seat assembly 10 is shown that has a back portion 12 that is adjustably mounted to a base member 14 by a reclining mechanism 15. The base portion is a generally flat plate member which in turn supports a seat cushion (not shown). The back portion 12 is mounted between a pair of mounting brackets 16 and 18, that are mounted to the base member. A first mounting bracket 16 is mounted to a first side 20 of the base member 14, while a second mounting bracket 18 is mounted to a second, opposing side 22 of the base member. Each mounting bracket defines an upwardly extending flange 24 that defines a bore 26 (FIG. 4). Each bore is sufficient to receive a spindle 28 that extends from the back portion 12 to pivotally mount the back portion to each of the mounting brackets.

The back portion 12 defines a pair of downwardly directed extensions 30 and 32 that are spaced from one another along the lower region of the back portion so they are positioned immediately adjacent the inner sides of the respective mounting brackets. Each of the extensions 30 and 32 define a plurality of gear teeth 34.

A first gear assembly 36 is rotatably mounted to the first mounting bracket 16 and engages the extension 30 to control the movement of the back portion 12 in a manner that will be described in greater detail hereinafter. As is best shown in FIG. 4, the first gear assembly includes a stub shaft 38 that has a first end portion 40 that defines head portion 41. A hexagonally shaped socket 42 is defined in the head portion 41 and opens onto the outer surface of the head portion. The stub shaft 38 also defines a generally cylindrical bearing portion 44 that is received within a bore 46 defined along a lower portion of the first mounting bracket 16 to rotatably mount the stub shaft to the first mounting bracket. A second end portion 48 of the stub shaft 38 is threaded and extends outwardly from the first mounting bracket to receive a threaded fastener, such as a nut 50. A tapered hub portion 52 is defined on the stub shaft between the bearing portion 44 and the second end portion 48 of the stub shaft. The tapered hub portion 52 is generally rectangular in cross section and is positioned on a first or outward side 54 of the first mounting bracket 16 when the stub shaft is positioned with the bearing portion 44 thereof in the bore 46 of the first mounting bracket. The tapered portion is directed radially inwardly at a slight angle and extends axially outwardly from the portion of the hub section that is nearest the first mounting bracket.

A first, or locking gear 56 defines a tapered receptacle 58 that is of a complimentary configuration to the tapered hub portion 52 defined by the stub shaft 38. The locking gear is positioned on the hub portion and is held in line contact with the stub shaft so as to prevent any relative movement therebetween. In its installed position, the locking gear is positioned adjacent the first side 54 of the first mounting bracket 16.

As is best shown in FIGS. 3 and 4, a side 60 of the locking gear 56 has an arcuate groove 62 defined therein. The groove 62 has first and second end portions 64 and 66 that are positioned a preselected distance apart and are located on a specific portion of the locking gear. The groove 62 is adapted to receive the head of a set screw 68 that is threadably engaged with the first mounting bracket 16. The groove is radially positioned about the axis of the locking gear 56 so that the head of the set screw will remain in the groove throughout the entire range of rotation of the locking gear. Contact between the head 68 of the set screw and the end portions 64 and 66 of the groove 62 define a stop means for both the rotation of the locking gear and the movement of the back portion 12 of the seat.

A second, or positioning gear, 76 is mounted on a shank portion 78 of the stub shaft 38 of the first gear assembly 36 on a second or inner side 80 of the first mounting bracket 16. The positioning gear 76 is enmeshed with the gear teeth 34 defined on the extension 30. The positioning gear is located between the head 41 of the stub shaft 38 and the first mounting bracket 16.

A second gear assembly 82 also includes a second stub shaft 84 that is similar in function to the stub shaft 38 of the first gear assembly. The stub shaft 84 has a first end portion 86 that defines a head portion 88. A hexagonally shaped socket 90 is formed in the head portion 88 and opens onto an outer surface of the head portion. The stub shaft 84 is rotatably received in a bore (not shown) defined in the second mounting bracket 18 in a manner similar to the mounting of stub shaft 38 to mounting bracket 16. A second end portion 96 of the stub shaft 84 defines a plurality of screw threads that receive a threaded fastener, such as a nut 98 to mount the stub shaft to the second mounting bracket in a manner to be described hereinafter.

A second positioning gear 100 is mounted on the second stub shaft 84 and is positioned on a first, or inner side 104 of the second mounting bracket 18. The second positioning gear 100 is enmeshed with the gears 34 formed on the extension 32 defined by the back portion 12.

A shaft member 106 has first and second end portion 108 and 110 respectfully, each of which defines a spherical hex head. Each of the end portions 108 and 110 are received within the respective hexagonally shaped sockets 42 and 90 defined by the respective stub shafts 38 and 84. Each hex head has a "crowned" shape to it to accommodate a limited amount of relative movement in an axial direction with respect to the respective stub shafts. Since both end portions are hexagonal in configuration they transmit rotation from one stub shaft to the other with very little or no backlash.

As is best shown in FIG. 3, a locking pawl 112 is pivotally mounted at 114 to the first mounting bracket 16. The mounting pawl has an engagement portion 116 that defines a singular tooth 118. The locking pawl 112 also defines a release member 120 that is offset from the engagement portion 116 with respect to the pivotal mounting 114. Rotational movement of the release member 120 will cause a similar movement of the engagement portion 116. The locking pawl 112 is mounted in alignment with the locking gear 56 of the first gear assembly 36. The tooth 118 of the engagement portion 116 is shaped such that it will contact each of any two adjacent teeth defined on the locking gear. The locking pawl is and biased by a spring member 122 toward a first position, wherein it is engaged with the locking gear,. The angle of the tooth is such that it will contact both of two adjacent teeth so that little or no backlash between the components will be experienced, even as wear between the components occurs. When the release member 120 of the locking pawl is engaged and rotated by the operator, the tooth will be rotated out of engagement with the locking gear. When this occurs, the locking gear and both positioning gears on the respective shaft assemblies are free to rotate. This in turn, allows the back assembly to be tilted with respect to the base portion to achieve a selected position according to the desires of the individual operator.

Industrial Applicability

During operation of the reclining mechanism 15, an operator, typically seated on the base member 14 of the seat assembly 10, may engage the release member 120 of the locking pawl 112 with one hand and rotate it slightly. With this rotation, the engagement portion 116 of the locking pawl is moved out of engagement with the locking gear 56. This will allow the locking gear as well as both positioning gears 76 and 100 to rotate together due to their interconnection via the shaft member 106. Since the positioning gears 76 and 100 are engaged with the respective extensions 30 and 32 of the back portion 12, the back portion is allowed to be moved about its pivotal mountings 28 to the respective mounting brackets 16 and 18. The rotational limits of the back portion are controlled by a stop member in the form of the set screw 68 that is positioned within the groove 62 defined by in the locking gear 56. Once the operator finds the desired angle of the back portion, the locking pawl 112 may be released and the engagement portion 116 will again be urged into contact with the locking gear under the bias of the spring 122.

Since the tooth 118 on the engagement portion 116 of the locking pawl 112 is configured to engage any two adjacent teeth of the locking gear 56 simultaneously, backlash, or relative movement between two components is prevented. Likewise, since the locking gear is mounted to the first stub shaft 38 at the taper hub portion 52, there is line contact between the two components. This mounting also transmits rotation without backlash no matter how much wear has occurred between the two components. Still further, the transmission of rotation between the first and second gear assemblies 36 and 82 occurs through the hex head connections between shaft member 106 and the sockets 42 and 90 defined in the respective stub shafts 38 and 84. Because of the hex head connections, there is virtually no backlash in this in the transmission of rotation between the positioning gears either. The result is a very stable, adjustable mounting for the back portion that is positively anchored on both sides thereof throughout its range of movement through the construction of the reclining mechanism. This construction greatly increases the comfort of an operator.

Another advantage provided with this invention resides in the ease of manufacture and assembly of the seat assembly. Since the shaft member 106 is provided with spherical, or "crowned" hex heads, it is permitted to move axially a preselected amount relative to the respective gear assemblies 36 and 82. This permits the shaft member to accommodate any lateral misalignment between the first and second mounting brackets that may occur as a result of the manufacturing processes of the various seat components. Since manufacturing tolerances do not need to be highly controlled, significant reductions in the cost of manufacture as well as the time required for assembly of the seat are realized.

Other aspects, objects and advantages of this invention can be obtained from a study of the drawings, the disclosure and the appended claims.

We claim:

1. A reclining mechanism for a seat, comprising:
   a base member;
   a first mounting bracket mounted to the base member on a first side thereof;
   a second mounting bracket mounted to the base member on a second side thereof;
   a back portion of the seat being positioned between and pivotally mounted to the first and second bracket members;
   a pair of extensions defined by the back portion, each having a plurality of gear teeth formed on a distal end portion thereof, said extensions being spaced from one another and positioned adjacent each of the respective mounting brackets;
   a first gear assembly having a hexagonally shaped socket defined therein, said first gear assembly being rotatably mounted to the first mounting bracket for meshing engagement with the gear teeth defined on one of said extensions defined by the back portion;
   a second gear assembly having a hexagonally shaped socket defined therein, said second gear assembly being rotatably mounted to the second mounting bracket for engagement with the gear teeth defined by the other of the extensions defined by the back portion; and
   a shaft member having first and second end portions, each end portion defining a spherical hex head adapted for receipt within the respective sockets defined by the first and second gear assemblies to selectively transmit rotation between or lock the position of the respective gear assemblies.

2. The reclining mechanism as set forth in claim 1 wherein the spherical hex heads defined by the shaft member define a crown that will accommodate an amount of axial misalignment between the respective first and second gear assemblies that falls within a range of 15 to 25 degrees to accommodate lateral misalignment between the first and second mounting brackets.

3. The reclining mechanism as set forth in claim 1 wherein the first and second mounting brackets each define a bore therethrough, said bore being adaptable to mount the respective gear assemblies for relative rotation with respect to the mounting brackets.

4. The reclining mechanism as set forth in claim 3 wherein a locking pawl is mounted to the first mounting bracket, said locking pawl having an engagement portion defined thereon that is adapted to engage the first gear and a release member that is remote from the engagement portion, said locking pawl being operable between a first position wherein the engagement portion is engaged with the first gear to prevent rotation thereof and a second position wherein the engagement portion is rotated away from contact with the first gear to permit rotation of the first and second gear assemblies and the angular positioning of the back portion of the seat.

5. The reclining mechanism as set forth in claim 3 wherein the first gear assembly has a first gear and a second gear, said first gear being positioned on a first side of the first mounting bracket and said second gear being positioned on a second side of the first mounting bracket opposite said first gear.

6. The reclining mechanism as set forth in claim 5 wherein the first gear assembly includes a stub shaft having a first end portion defining the hexagonally shaped socket, a bearing portion and a threaded second end portion, said stub shaft being mounted to the first mounting bracket with the bearing portion positioned within the bore defined by the first mounting bracket, the second gear positioned between the first end portion of the stub shaft and the mounting bracket and the first gear positioned between the mounting bracket and a fastener that is threadably engaged with the second end portion of the stub shaft.

7. The reclining mechanism as set forth in claim 6 wherein the stub shaft assembly further includes a tapered hub portion having a generally rectangular configuration and the first gear has a tapered receptacle formed therein having a generally rectangular configuration, said hub portion being adapted for receipt within the receptacle of the first gear to mount the gear to the stub shaft with substantially no relative movement therebetween.

8. The reclining mechanism as set forth in claim 6 wherein the second gear assembly includes a second stub shaft having a first end portion defining the hexagonally shaped socket, a bearing portion and a threaded portion, said second stub shaft being mounted to the second mounting bracket with the bearing portion positioned within the bore defined by the second mounting bracket, the gear located between the first end portion of the second stub shaft and the second mounting bracket and a fastener threadably engaged with the second end portion of the second stub shaft.

9. The reclining mechanism as set forth in claim 5 wherein the first gear of the first gear assembly is a locking gear and the second gear is a positioning gear.

10. The reclining mechanism as set forth in claim 9 wherein the locking gear further defines an arcuate groove having first and second end portions positioned a preselected distance apart on a side thereof that faces the first mounting bracket, said groove being adapted to receive a stop member that is mounted to the first mounting bracket wherein contact between the stop member and the respective first and second end portions determine a rotational limit for the respective first and second gear assemblies and therefor a fore and aft maximum position of the back portion of the seat.

11. A reclining mechanism for a back portion of a seat, comprising:

a base portion;

first and second mounting bracket mounted on opposing sides of the base portion;

a pair of extensions defined by the back portion, each extension having a plurality of gear teeth formed on a distal end thereof and being positioned in spaced relation to one another adjacent the respective mounting brackets;

a first gear assembly having a stub shaft defining a hexagonally shaped socket on a first end portion thereof, a locking gear mounted on the stub shaft and being positioned on a first side of the first mounting bracket, a positioning gear mounted on the stub shaft and being positioned on a second side of the mounting bracket for meshing engagement with one of the extensions defined by the back portion;

a second gear assembly having a stub shaft defining a hexagonally shaped socket on a first end portion thereof and a positioning gear mounted on a first side of the second mounting bracket in meshing engagement with the other of the extensions defined by the back portion; and a shaft member having first and second end portions, each defining a spherical hex head and being adapted for engagement with one of the respective hexagonally shaped sockets defined by the first and second gear assemblies, said shaft member being adapted to accommodate a preselected amount of axial movement relative to the respective gear assemblies to accommodate a preselected amount of lateral misalignment between the respective mounting brackets.

12. The reclining mechanism as set forth in claim 11, wherein a locking pawl is mounted on the first mounting bracket and is moveable between a first position wherein the locking pawl is engaged with the locking gear to prevent rotation of the locking gear, the first and second gear assemblies and the back portion, and a second position wherein the locking pawl is moved away from engagement with the locking gear to permit rotation of the locking gear, the first and second gear assemblies and the back portion.

13. The reclining mechanism as set forth in claim 11 wherein the locking gear defines an arcuate groove on a face thereof adjacent the first mounting bracket, said groove having end portions spaced a preselected distance apart and being adapted to receive a stop member therein that extends from the first mounting bracket, wherein contact between the end portions of the groove and the stop member define a fore and aft maximum position of the back portion of the seat.

14. The reclining mechanism as set forth in claim 11 wherein the stub shaft of the first gear assembly defines a tapered hub portion having a generally rectangular configuration and the locking gear defines a tapered receptacle formed therein having a generally rectangular configuration, said hub portion being adapted for receipt within the receptacle of the locking gear to mount the gear to the stub shaft with substantially no relative movement therebetween.

* * * * *